(No Model.)
C. S. BRADLEY.
METHOD OF AND APPARATUS FOR CONVERTING THE ELECTRICAL ENERGY OF ALTERNATING CURRENTS INTO MECHANICAL MOTION.
No. 460,046. Patented Sept. 22, 1891.
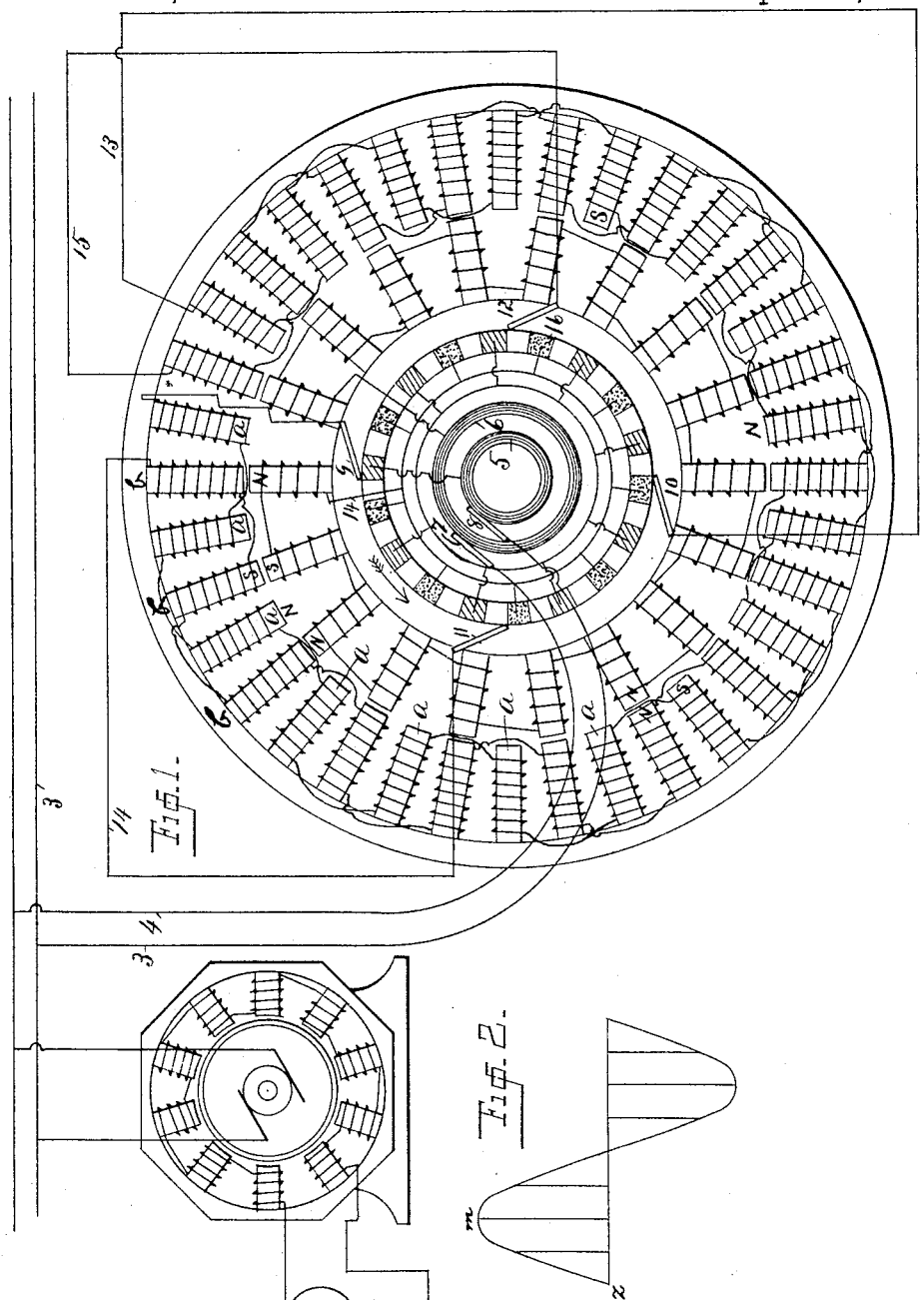
Witnesses
W. H. Courtland
E. C. Grigg
Inventor:—
Charles S. Bradley
by Read & Worthington
Attys.

UNITED STATES PATENT OFFICE.

CHARLES S. BRADLEY, OF AVON, NEW YORK.

METHOD OF AND APPARATUS FOR CONVERTING THE ELECTRICAL ENERGY OF ALTERNATING CURRENTS INTO MECHANICAL MOTION.

SPECIFICATION forming part of Letters Patent No. 460,046, dated September 22, 1891.

Application filed November 8, 1890. Serial No. 370,723. (No model.)

*To all whom it may concern:*

Be it known that I, CHARLES S. BRADLEY, a citizen of the United States, residing at Avon, in the county of Livingston and State of New York, have invented certain new and useful Improvements in Methods of and Apparatus for Converting the Electrical Energy of Alternating Currents into Mechanical Motion; and I do hereby declare the following to be a full, clear, and exact description of the invention, such as will enable others skilled in the art to which it appertains to make and use the same.

This invention relates to the conversion of the electrical energy of alternating currents into mechanical motion, the object being to render such conversion more efficient than is practicable with modes of operation or systems of conversion heretofore proposed. In the present state of the art the conversion is made by means of alternating-current motors, the operation of such motors depending for the most part upon a progressive travel of a polar line created by two currents differing in their time periods, such difference of period being either created at the generating-station and transferred thence by two independent circuits to the motor or some local device being used to create a lag of one set of waves behind the other, so that they may be carried through independent circuits in the motor. By my invention no such provisions are necessary; but a motor may be connected directly to a pair of alternating-current terminals, the voltage of such current being preferably reduced to a convenient and safe tension in the circuit in which the motor is placed. An ordinary electric motor provided with laminated field magnets and armature will operate under such conditions; but its efficiency is very low by reason of the high degree of self-induction and the low effective counter electro-motive force developed. It is a well-understood characteristic of electric motors that efficiency varies directly as the counter electro-motive force developed by the operation of the motor. The low efficiency of alternating-current motors as compared with direct-current motors is due principally to the large amount of self-induction developed in such motors by the alternating wavers of current and the consequently low effective counter electro-motive force. Self-induction opposes the passage of current through the motor, and such opposition is not accompanied by the development of useful work on the rotating element of the motor. Counter electro-motive force also opposes the passage of current through the motor; but such opposition is all useful, and proportionally as the counter electro-motive force rises the useful work increases. Any method which will lower the self-induction *per se* will increase the useful work by permitting more current to be utilized. Any method, also, which raises the counter electro-motive force *per se* will correspondingly increase the amount of useful work. It follows from this that a relative increase of the counter electro-motive force compared with the self-induction will increase the amount of useful work given off by the motor.

It is the object of my invention to attain this end. The result is accomplished by developing in each armature-coil of a motor a greater number of waves of counter electro-motive force during the travel of the rotating member through any given angle than the number of waves of supply-current which traverses the line and acts to propel the motor in the time occupied by such travel. The motor is so organized that when interposed in an alternating-current circuit or forming part of an alternating-current system with a frequency of reversal for which the motor is adapted each armature-coil cuts the magnetic field developed by any half-wave of alternating current more than once while such half-wave lasts.

In carrying out the invention each half-wave is subdivided by a commutator into several independent periods, and the periods of current are led through the armature-circuit in such a way that the field of force developed by the wave is cut as often as there are subdivisions of the wave, thus creating a high counter electro-motive force by reason of cutting an increased number of lines of force.

My invention therefore consists in the method of and apparatus for converting the electrical energy of an alternating current into mechanical motion by raising the amount of effective counter electro-motive force developed by rotation relatively to the self-induction.

It also consists in the method of and apparatus for making such conversion by developing a phase of counter-current during the passage through the motor of less than a corresponding phase of the line-current.

It also consists of an alternating-current system provided with a generator for delivering currents of a determined frequency of reversal and a motor so organized that when operating at its working speed under the influence of such current the armature-coils will cut the fields of force developed by the field-magnets oftener in a definite interval than the number of reversals of current developed on line by the generator during such interval.

It also involves other features which will be specifically indicated in the claims appended to this specification.

The invention will be more thoroughly understood by reference to the accompanying drawings, in which—

Figure 1 illustrates diagrammatically an alternating-current generator and one form of motor involving the features of the invention, and Fig. 2 is a diagrammatic illustration of the manner in which the wave of alternating current is subdivided by the commutator.

1 is an alternating-current generator of the multipolar type, though other forms of alternating-current generators might be used, and 2 3 are the mains by which the current is led from the generator to any distant point.

3 and 4 are service-conductors connecting the mains with the motor. In these service-conductors the current is made of a suitable tension, if the line-current is of very high voltage, by means of transformers or other reducing devices. Upon the shaft of the motor are mounted two continuous ring-contacts 5 6, upon which the brushes 7 8 bear. The ring 5 is connected directly with one set of segments of the commutator, and the ring 6 is connected first with the field-magnet circuit, by which is meant that circuit of the motor which is not commutated, and then with an alternating set of segments of the commutator. As shown in the illustrations, there are eighteen poles to the field-magnet. There are as many connected commutator-plates as there are field-magnet poles. In the motor illustrated there are two sets of armature-poles, each set having as many as there are in the field-magnet. As the current preserves the polarity of one set of armature-poles only during the movement of the field-magnet from one armature-pole to the next, there are thirty-six segments to the commutator. Only eighteen of these segments are, however, as stated before, connected, the other eighteen being simply idle blocks, which may therefore be either of metal or of insulating material, as may be desired.

Upon the commutator bear two pairs of brushes 9 10 and 11 12, the former pair being connected with one armature-circuit and the latter pair with the other armature-circuit, the two sets of armature-poles being alternately arranged, as shown, the letters $a\ a$ representing one set, and $b\ b$ the other. The brushes are so set that as one pair passes out of action the other pair will be just coming into action. As shown in the drawings, the brushes 9 and 10 have come into action and 11 and 12 have just passed out of action. The set of armature-coils marked $a\ a$ are therefore now receiving current, and the set of armature-coils marked $b\ b$ have just been cut out of circuit. This condition of affairs will last until the field-magnet has rotated through a radial angle equal to that occupied by one commutator-segment, when the coils of $a\ a$ will be cut out and those of $b\ b$ will be cut into circuit. As the field-magnet revolves, therefore, it will be understood that during the continuation of a single wave of the generator-current the circuit is progressively shifted from one set of armature-coils to the other, while its connection remains continuous with the field-magnet circuit, and the coils are so wound that the field-magnet poles will at any instant be of an opposite polarity to the adjacent armature-poles in advance of them in the direction of rotation. Under these conditions a continuous rotary torque is exerted upon the field-magnet.

The number of poles to the field-magnet is made greater than the number of poles to the supply-generator in order to increase the extent of subdivision of the waves, so that when operating at its normal speed but a fractional portion of any wave will pass through one set of armature-coils before the current is shifted to the other set by the commutator. Let us analyze the condition of the motor during the passage of any portion of an alternating wave, as from $z$ to $m$ in Fig. 2, and suppose the direction of the flow at this instant to be from the supply-conductors to the brush 8. The path through the machine will then be from the brush 8 to ring 5, thence to the commutator-segment and brush 9, through the armature-circuit $a\ a$, magnetizing alternate poles of the armature system, thence by conductor 13 to the brush 10, to commutator-segment, to field-magnet circuit by conductor 14, through the field-magnet circuit to ring-contact 6, and thence out by brush 7. During this time the alternate field-magnet poles will be magnetized north and south, and the series of armature-poles marked $a$ correspondingly magnetized south and north. Direction of rotation will then ensue, as indicated by the arrow, until the commutator has moved angularly the space occupied by one of its segments, when the other set of brushes 11 12 will come into operation and the current will be switched through brush 11 by way of conductor 14 to the armature-circuit $b$, polarizing successive poles of this circuit in the same sense as corresponding poles of the circuit just cut out, thence by conductor 15 to brush 12, to the commutator-segment 16, to the field-magnet circuit by conductor 14, through the field-magnet circuit to ring 6, to brush 7, and out. It will thus be seen that, although the current has been shifted to the series of armature-coils in advance of the field-magnet, it still continues in the field-magnet circuit. This progressive transference from one set of armature-coils to the other continues during the operation and preserves the rotation of the field-magnet. Each alternating-current wave is thus subdivided and the several subdivisions parceled out to the two armature-circuits in succession. In passing through the field-magnet coils the first half-wave of current will produce a certain magnetic field. It also produces a certain amount of self-induction. It therefore follows that we must cut the lines of force of the magnetic field at a rate which will give us a counter electro-motive force the magnitude of which bears a certain relation to the electro-motive force of self-induction in order that the motor shall be effective with a reasonable current over the lines and through the motor and generator. I have found that this effect is not reached until the fields of force developed by the applied current are cut oftener in a given time than the number of current-waves which occur in that time. Having once attained a high counter electro-motive force relatively to the self-induction, the counter electro-motive force assists in reducing the self-induction. As the counter electro-motive force corresponds in time to the waves of alternating current, (for the reason that the field-magnet is produced by the current,) it follows that the counter electro-motive force lags behind the applied electro-motive force, and while the first part of the counter electro-motive force due to any wave opposes such wave the last part, from the amount of lag, assists the applied electro-motive force of the following wave of opposite kind, and this in turn, by virtue of hastening the reversal of magnetism in the motor, reduces the lag, and these reach practical value when the cutting of magnetic fields of force occurs with a rapidity greater than the rate of alternation of supply-current and best when about three times the frequency—that is to say, the motor should in all cases be designed with reference to the rate of alternation under which it is designed to operate, or with reference to the generator producing such rate of alternation. If the generator delivers a current on line having a frequency of sixteen thousand per minute, the motor will be provided with such a number of pole-pieces that throughout its range of working speed the fields of force will be cut by the armature-coils a greater number than sixteen thousand times per minute, and as the counter electro-motive force delivered by the armature is determined by the number of lines of force it cuts in a given time it is evident that the counter electro-motive force must be greater than in a case where the armature-coils cut the fields of force a less number of times per minute than the number of reversals on line during the minute. Such a result is evidently impossible with the two-pole laminated machine hereinbefore referred to, since if a ten-pole generator were supplying current the motor must revolve at least five times as fast as the generator in order to enable the motor-armature to cut the field of force with the same frequency as the generator-armature. Such a result is also evidently impossible with multipolar synchronous machines, since at all stages below synchronism the armature-coils must cut the fields of force less frequently than the generator-coils, and at synchronism they can only cut them with the same frequency. When, however, I provide the motor with a number of field-magnet poles in excess of the number of field-magnet poles in the generator or with a number of field-magnet poles such that during one revolution of the armature more reversals of current will be produced in the armature-coils than there are reversals of supply-current during such revolution, and so arrange the commutator of the motor that the counter-current shall be in the same direction so long as the field-magnetism due to any half-wave lasts, the motor will operate with increased efficiency and will exert a strong torque.

In the diagram Fig. 2 the areas inclosed by any two vertical lines illustrate the method in which the commutator divides the wave of current.

I desire to have it understood that while I have described a motor of a specific design my invention is applicable to other forms of motor.

The details as to the mode of establishing the polar points and arrangement of the commutator and the winding of the several magnetic elements may be variously arranged in order to attain the desired result. I have found that good results may be secured with continuous armature-coils if a multipolar field be adopted for use therewith. For example, the Müller winding for dynamo-machines, as described in Patent No. 331,726, of 1885, when provided with a sufficient number of poles relatively to the generator, may be used to carry out my method.

In all cases my method of conversion of electrical energy into mechanical motion requires for its development the production of a greater number of reversals of magnetism in the motor-armature per minute when operating at its working speed than the frequency per minute of the current under which the motor is designed to operate.

Having thus described my invention, what I claim as new, and desire to secure by Letters Patent, is—

1. The method of converting the electrical energy of an alternating current into mechanical motion, which consists in leading such current through an electric motor and raising the effective counter electro-motive force developed by the rotation of the motor relatively to the self-induction by cutting the field of force rapidly relatively to the period of the propelling-current.

2. The method of converting the electrical energy of an alternating current into mechanical motion, which consists in leading such current through an electric motor and developing in each armature-coil a greater number of counter electric waves during the travel of the rotative member through any part of a cycle of rotation than the number of alternating-current waves utilized during such travel.

3. The method of converting the electrical energy of an alternating current into mechanical motion, which consists in leading such current through an electric motor and developing in each armature-coil a phase of counter electro-motive force during the passage through the motor of less than a corresponding phase of the propelling alternating current.

4. The method of converting the electrical energy of an alternating current into mechanical motion, which consists in leading such current through an electric motor and developing by its rotation during any interval a greater number of magnetic reversals in the armature than the number of reversals of the propelling-current.

5. The method of converting the electrical energy of an alternating current into mechanical motion, which consists in leading the current through an electric motor and developing throughout the range of working speed of the motor a number of magnetic reversals in the armature produced by its rotation in the field exceeding the number of reversals of the propelling-current by passing the current around a suitable number of field-magnet poles of alternating sign and through a suitable combination of coils in the armature.

6. The method of converting the electrical energy of an alternating current into mechanical motion, which consists in leading such current continuously through the exciting-circuit of one member of the motor and leading fractional portions of each impulse thereof progressively through changing circuits of the other member of the motor, whereby the effective counter electro-motive force of the motor is increased relatively to the self-induction.

7. The method of converting the electrical energy of an alternating current into mechanical motion, which consists in leading such current unaltered through one member of an electric motor, while in the other member of the motor it passes through groups of coils suitably connected and arranged, and thereby cutting progressively by more than one group of coils throughout the working speed of the motor the lines of force induced in the field-magnet for each successive wave or impulse of the propelling-current.

8. In an alternating-current motor designed to operate within given limits of speed and in a circuit of predetermined rate of alternation, a multipolar field-magnet, an armature provided with groups of coils, and a commutator connected with the groups, the number of field-poles so adapted to the alternations of the current that throughout the range of working speed of the motor there shall take place a progressive travel of the polar line through each group of coils on the armature while a single impulse or less of the propelling-current lasts.

9. An alternating-current electric motor having such number of field-poles of alternating sign, in combination with such number and grouping of coils in the armature, that throughout its predetermined working range of speed the magnetic reversals in the armature produced by its rotation in the field shall exceed the reversals in the propelling-current.

10. In an alternating-current motor designed to operate within given limits of speed and in a circuit of predetermined rate of alternation, a multipolar field-magnet and armature, the latter having its coils connected with each other and with a commutator and brushes in groups, the field-poles and armature groups being of such number that throughout the range of the working speed of the motor the armature-coils shall cut the fields of force with a greater frequency than the reversals of the propelling-current.

11. In an alternating-current motor designed to operate within given limits of speed and in a circuit of predetermined rate of alternation, a multipolar field-magnet and an armature having such number of poles and number and grouping of circuits, respectively, that throughout the range of its working speed while each separate wave of the alternating-current passes through the exciting-circuit of one member of the motor fractional portions of the same wave shall pass progressively through changing circuits of the other member of the motor.

12. The combination of an alternating-current generator, a distribution-circuit connected therewith, and a multipolar electric motor having a number of field-magnet poles sufficient to develop within the range of working speed of the motor more reversals of magnetism in the armature than reversals of current delivered by the generator, and a commutator for shifting the relation of the armature-coils to the brushes.

In testimony whereof I affix my signature in presence of two witnesses.

CHARLES S. BRADLEY.

Witnesses:
E. C. GRIGG,
S. E. FIELD.